(12) United States Patent
Okuzuka et al.

(10) Patent No.: US 10,062,515 B2
(45) Date of Patent: Aug. 28, 2018

(54) CAPACITOR STRUCTURE

(71) Applicants: CALSONIC KANSEI CORPORATION, Saitama-shi, Saitama (JP); SHIZUKI ELECTRIC CO., INC., Nishinomiya-shi, Hyogo (JP)

(72) Inventors: Gen Okuzuka, Saitama (JP); Masanori Ishida, Nishinomiya (JP); Yuji Shiomi, Nishinomiya (JP)

(73) Assignees: CALSONIC KANSEI CORPORATION, Saitama (JP); SHIZUKI ELECTRIC CO., INC., Hyogo (JP)

( * ) Notice: Subject to any disclaimer, the term of this patent is extended or adjusted under 35 U.S.C. 154(b) by 0 days.

(21) Appl. No.: 15/545,602

(22) PCT Filed: Jan. 14, 2016

(86) PCT No.: PCT/JP2016/050949
§ 371 (c)(1),
(2) Date: Jul. 21, 2017

(87) PCT Pub. No.: WO2016/117441
PCT Pub. Date: Jul. 28, 2016

(65) Prior Publication Data
US 2018/0019062 A1 Jan. 18, 2018

(30) Foreign Application Priority Data

Jan. 22, 2015 (JP) .................................. 2015-010209
Aug. 24, 2015 (JP) .................................. 2015-164866

(51) Int. Cl.
*H01G 2/04* (2006.01)
*H01G 2/08* (2006.01)
(Continued)

(52) U.S. Cl.
CPC ................. *H01G 4/32* (2013.01); *H01G 2/08* (2013.01); *H01G 2/106* (2013.01); *H01G 4/224* (2013.01); *H01G 4/38* (2013.01)

(58) Field of Classification Search
CPC ............... H01G 2/02; H01G 2/04; H01G 2/08
See application file for complete search history.

(56) References Cited

U.S. PATENT DOCUMENTS

2003/0054239 A1  3/2003  Watanabe et al.
2009/0080126 A1  3/2009  Wilk et al.
(Continued)

FOREIGN PATENT DOCUMENTS

CN    101432829 A    5/2009
CN    1405918 A     12/2010
(Continued)

*Primary Examiner* — Eric Thomas
(74) *Attorney, Agent, or Firm* — Foley & Lardner LLP

(57) ABSTRACT

This capacitor structure is provided with a capacitor body in which a plurality of wound-type capacitors are housed in a housing, and which is fixed to a fixing object via a fastening tool (a cylindrical member and a fixing bolt). The capacitor structure is configured such that the capacitor body is fixed to the fixing object by inserting the fastening tool into at least one of a gap formed between the outer peripheral surfaces of the wound-type capacitors or gaps formed between the outer peripheral surfaces of the wound-type capacitors and the inner wall of the housing, in a state in which the wound-type capacitors are installed side by side on the floor of the housing.

13 Claims, 18 Drawing Sheets

(51) Int. Cl.
 *H01G 4/32* (2006.01)
 *H01G 4/38* (2006.01)
 *H01G 2/10* (2006.01)
 *H01G 4/224* (2006.01)

(56) References Cited

U.S. PATENT DOCUMENTS

| | | |
|---|---|---|
| 2010/0060243 A1 | 3/2010 | Niigaki et al. |
| 2012/0081866 A1 | 4/2012 | Wickett et al. |
| 2012/0082887 A1 | 4/2012 | Ninomiya et al. |

FOREIGN PATENT DOCUMENTS

| | | | |
|---|---|---|---|
| DE | 10 2010 012 331 A1 | | 9/2011 |
| JP | H05-219704 A | | 8/1993 |
| JP | 2002-184374 A | | 6/2002 |
| JP | 2011-009477 A | | 1/2011 |
| JP | 2013-171995 A | | 9/2013 |
| JP | 2013211325 A | * | 10/2013 |
| JP | 2014078549 A | * | 5/2014 |
| WO | WO-2006/134859 A1 | | 12/2006 |
| WO | WO-2010/067514 A1 | | 6/2010 |
| WO | WO-2012/044501 A2 | | 4/2012 |
| WO | WO-2012/105496 A1 | | 8/2012 |
| WO | WO-2013/164332 A1 | | 11/2013 |

\* cited by examiner

FIG. 2
(a)
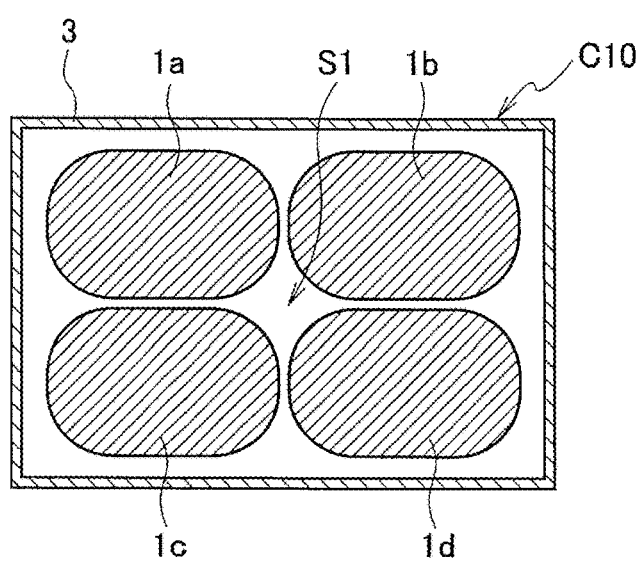
(b)
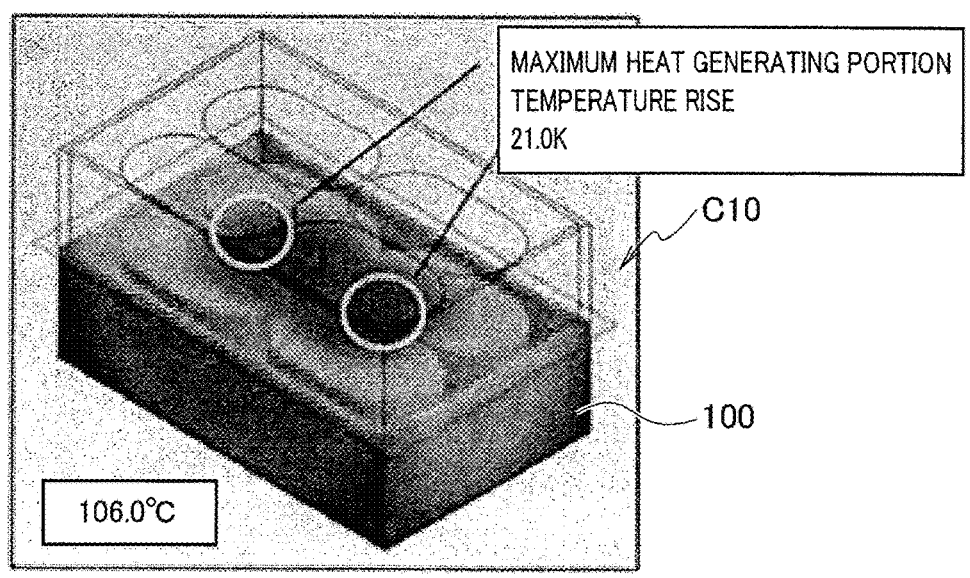

FIG. 4
(a)
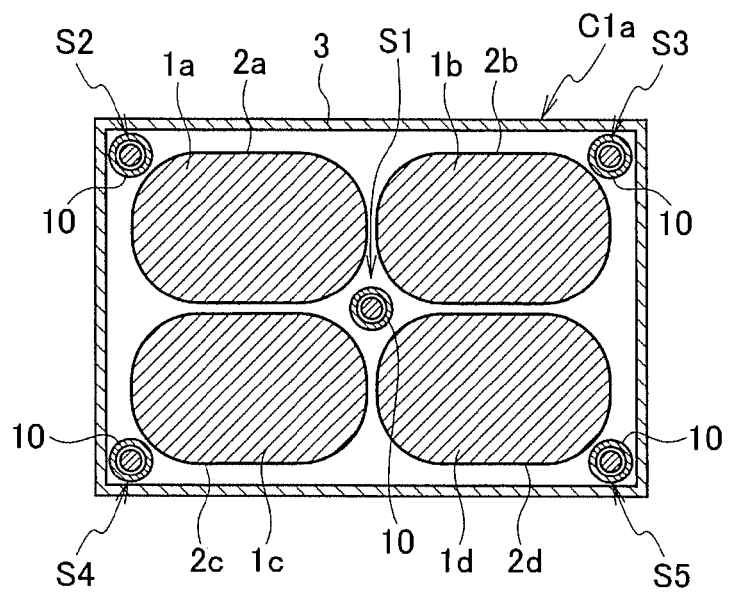
(b)
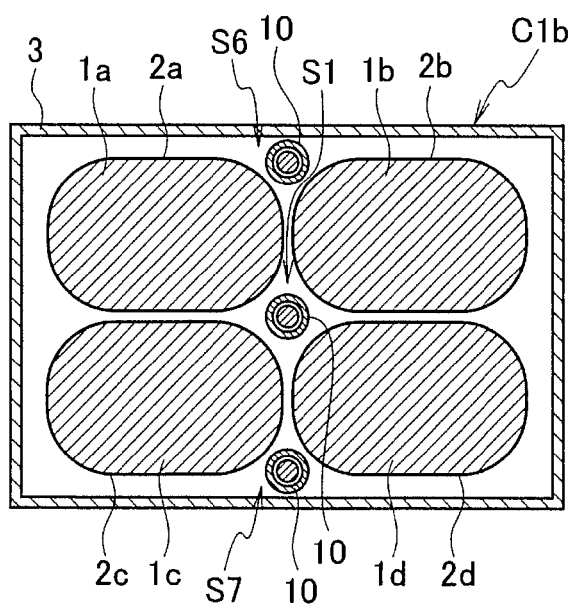

FIG. 12
(a)
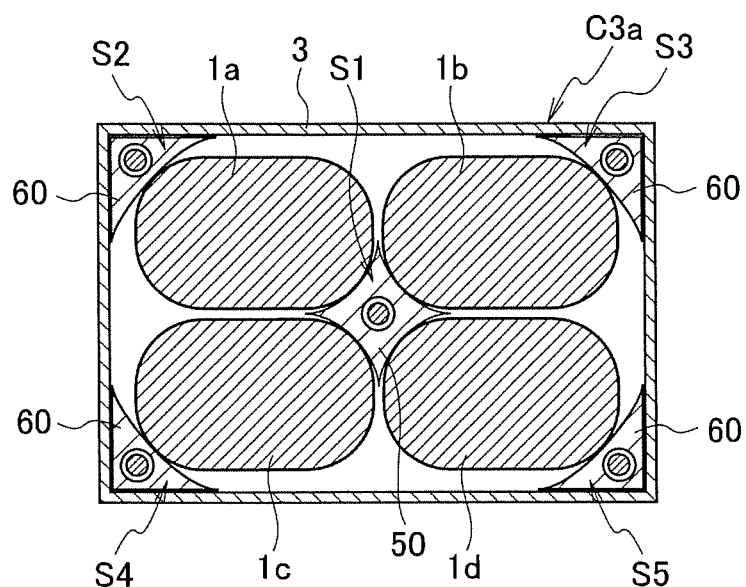
(b)
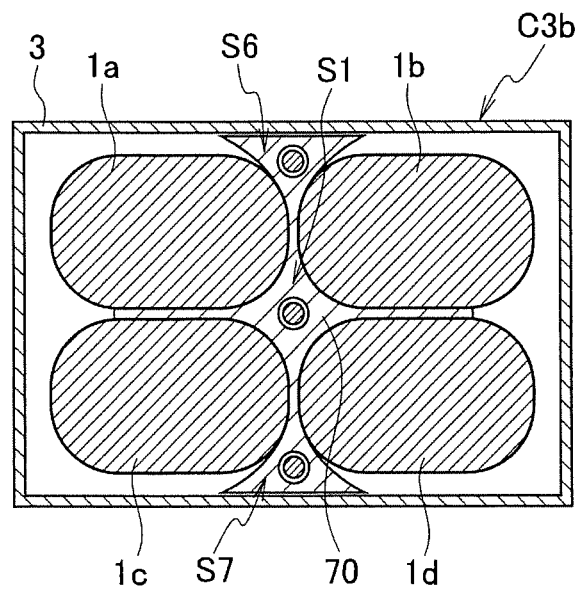

FIG. 18
(a)
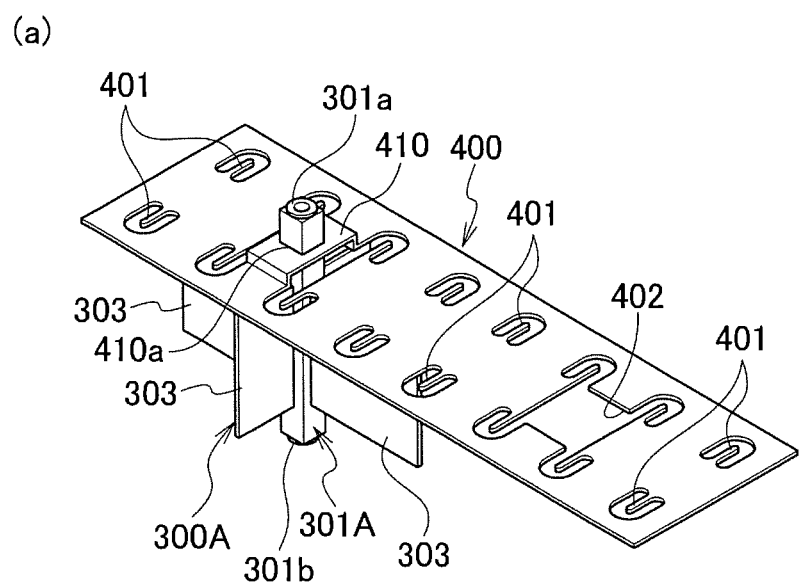
(b)
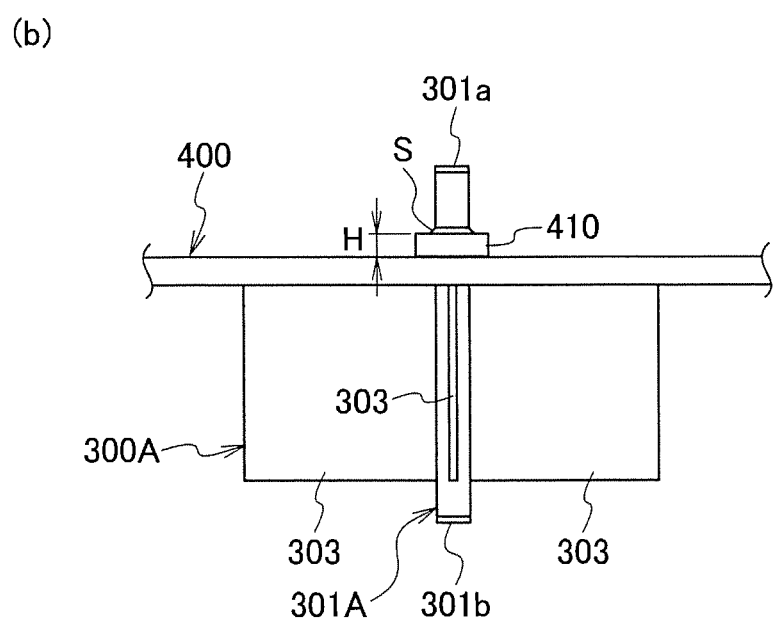

CAPACITOR STRUCTURE

TECHNICAL FIELD

The present invention relates to a capacitor structure in which a plurality of wound-type capacitors are stored in a housing.

BACKGROUND ART

A film capacitor has been generally used as a smoothing capacitor used in an in-vehicle inverter or the like in consideration of good frequency responsibility and ease in grasping failure modes.

Film capacitors include a film laminated type and film wound type, but for in-vehicle applications, use of relatively low cost wound-type capacitors is mainstream.

Techniques related to such a capacitor structure have been proposed (see Patent Literature 1).

In the conventional technique related to Patent Literature 1, through holes which coincide with the through holes of a regulator case are provided at both ends of a capacitor case. In addition, a storage portion for storing capacitor elements in which a pair of terminals are connected to electrodes is formed.

In such a conventional wound-type capacitor, for fixing the capacitor to an electronic device or the like mounted on a vehicle or the like, it has been common to use a fixing component such as a bracket or to fix the capacitor with bolts or the like by providing a seating surface for fixing or a reinforcement structure outside a resin case of a capacitor body that houses a wound-type capacitor.

In addition, the capacitor itself is arranged, for example, on a metal member or the like having a high thermal conductivity to take measures for heat radiation from the capacitor.

CITATION LIST

Patent Literature

Patent Literature 1: JP 5-219704 A

SUMMARY OF INVENTION

Technical Problem

However, as shown in FIGS. 22 and 23, in the prior art as described above, protrusions for fixing (refer to the regions D1 to D3) have projected from the case. Thus, there has been a problem that this is one of the factors hindering downsizing of devices and systems of in-vehicle inverters and the like.

That is, in a capacitor C50 shown in FIG. 22, since protrusions 501a and 501b for fixing are provided outside a housing 500, regions for mounting (spaces) D1 and D2 are required on the mounting side of an in-vehicle inverter or the like at the time of mounting. For this reason, downsizing of an in-vehicle inverter or the like is hindered.

Similarly in a capacitor C60 shown in FIG. 23, since a protrusion 601 for fixing is provided outside a housing 600, a region for mounting (space) D3 become necessary on the mounting side of an electronic device or the like at the time of mounting.

Further, in the prior art, it has been necessary to arrange the capacitor on a metal member or the like in order to enhance the heat dissipation of the capacitor itself. For this reason, placement positions of the capacitors are restricted, and there is also a drawback that the degree of freedom in designing devices and systems of in-vehicle inverters or the like is reduced.

The present invention has been made in view of the above problems, and an object of the present invention is to provide a capacitor structure that can reduce the size of the entire capacitor including the housing, and that can improve the degree of freedom in designing a mounted device by enhancing heat dissipation of the capacitor itself.

Solution to Problem

In order to achieve the above object, a first aspect of the capacitor structure according to the present invention is a configuration of a capacitor structure which includes a plurality of wound-type capacitors, a housing which houses the plurality of wound-type capacitors, and a fastener which fixes a capacitor body in which the plurality of wound-type capacitors are stored in the housing to a fixing object, and in which in a state where the wound-type capacitors are arranged side by side on the bottom of the housing, the capacitor body is configured to be fixed to the fixing object by inserting the fastener through at least one of gaps formed between outer peripheral surfaces of the respective wound-type capacitors or formed between the outer peripheral surfaces of the respective wound-type capacitors and an inner wall of the housing.

A second aspect according to the present invention is a configuration of a capacitor structure according to the first aspect in which the fastener includes a metallic cylindrical member inserted through at least one of the gaps and a fixing bolt inserted from an outside of the housing through the cylindrical member and screwed to the fixing object.

A third aspect according to the present invention is a configuration of a capacitor structure according to the second aspect in which the fastener includes a heat conducting plate arranged so as to be in contact with the outer peripheral surfaces of the respective wound-type capacitors arranged side by side, and the heat conducting plate is thermally joined to the metallic cylindrical member.

A fourth aspect according to the present invention is a configuration of a capacitor structure according to the second or the third aspect in which a cross-sectional shape of the cylindrical member is similar to a shape of the gap in a plan view, and an outer wall surface of the cylindrical member is configured to be in contact with the outer peripheral surfaces of the wound-type capacitors forming the gap.

A fifth aspect according to the present invention is a configuration of a capacitor structure according to the second to the fourth aspects in which a first electrode plate arranged on a positive electrode terminal side of the respective wound-type capacitors; and a second electrode plate arranged on a negative electrode terminal side of the respective wound-type capacitors, wherein the metallic cylindrical member includes a first metallic cylindrical member and a second metallic cylindrical member, the first metallic cylindrical member is joined to the first electrode plate, the second metallic cylindrical member is joined to the second electrode plate, and each of ends of the first metallic cylindrical member and the second metallic cylindrical member, which is fastened to the fixing object, is exposed to the outside of the housing to constitute a terminal.

A sixth aspect according to the present invention is a configuration of a capacitor structure according to the fifth aspect in which a first insulating portion that insulates the first electrode plate from the second metallic cylindrical member is formed on the first electrode plate, and a second insulating portion that insulates the second electrode plate from the first metallic cylindrical member is formed on the second electrode plate.

A seventh aspect according to the present invention is a configuration of a capacitor structure according to the fifth or the sixth aspect in which a junction between the first metallic cylindrical member and the first electrode plate or a junction between the second metallic cylindrical member and the second electrode plate includes a step formed in a direction away from the wound-type capacitors.

An eighth aspect according to the present invention is a configuration of a capacitor structure according to the fifth to the seventh aspect in which the junction includes an insertion hole into which an end of the first metallic cylindrical member or the second metallic cylindrical member is inserted, and an edge of the insertion hole and the end of the first metallic cylindrical member or the second metallic cylindrical member are joined with solder.

Advantageous Effects of Invention

According to the capacitor structure of the first aspect, the protrusion for fixing does not project from the housing. Therefore, the entire capacitor including the housing can be downsized. Also, heat can be dissipated through fasteners.

According to the capacitor structure of the second aspect, the fastener is composed of a metallic cylindrical member inserted through at least one of the gaps and a fixing bolt inserted from an outside of the housing through the cylindrical member and screwed to the fixing object. Therefore, the inner wall of the housing can be supported by the metallic cylindrical member, and the housing can be prevented from being deformed by the fastening force when being fixed to the fixing object by the fixing bolt.

According to the capacitor structure of the third aspect, the fastener is provided with a heat conducting plate arranged so as to be in contact with the outer peripheral surface of each of the wound-type capacitors arranged side by side and the heat conducting plate is thermally joined to the metallic cylindrical member. Therefore, the heat generated by the wound-type capacitor can be efficiently released to the outside of the housing via the heat conducting plate, the cylindrical member and the fixing bolt.

According to the capacitor structure of the fourth aspect, a cross-sectional shape of the cylindrical member is formed to be similar to a shape of the gap in a plan view, and the outer wall surface of the cylindrical member is configured to be in contact with the outer peripheral surfaces of the wound-type capacitors forming the gap. Therefore, the heat generated by the wound-type capacitor can be efficiently released to the outside of the housing.

According to the capacitor structure of the fifth aspect, by arranging the first electrode plate and the second electrode plate in the housing and by allowing the metallic cylindrical members to have an electrically connecting function, the electrical connection of the wound-type capacitors can be achieved without exposing the first electrode plate and the second electrode plate that are bus bars from the housing. Therefore, the size of the capacitor including the housing can be reduced.

According to the capacitor structure of the sixth aspect, a first insulating portion that insulates the first electrode plate from the second metallic cylindrical member is formed on the first electrode plate, and a second insulating portion that insulates the second electrode plate from the first metallic cylindrical member is formed on the second electrode plate. Therefore, respective ends fastened to the fixing object can be exposed to the outside from the housing without short-circuit.

According to the capacitor structure of the seventh aspect, a junction between the first metallic cylindrical member and the first electrode plate, or a junction between the second metallic cylindrical member and the second electrode plate has a step formed in a direction away from the wound-type capacitor. Therefore, when the first electrode plate, second electrode plate and metallic cylindrical members are soldered together, damage of the capacitor element of the wound-type capacitor due to heat conducting can be reduced.

According to the capacitor structure of the eighth aspect, the edge of the insertion hole of the junction and the end of the metallic cylindrical member are joined with solder. Therefore, secure electrical joining can be performed.

BRIEF DESCRIPTION OF DRAWINGS

FIG. 1(a) is a cross-sectional view showing a schematic configuration of the capacitor structure, FIG. 1(b) is a cross-sectional view taken along line IB-IB, and FIG. 1(c) is a cross-sectional view taken along line IC-IC.

FIG. 2(a) is a cross-sectional view showing a configuration example of a capacitor structure according to a comparative example and FIG. 2(b) is an explanatory view showing a thermal simulation result.

FIGS. 4(a) and 4(b) are cross-sectional views showing other configuration examples of the capacitor structure according to the first embodiment.

FIG. 7(a) is a cross-sectional view showing a schematic configuration of the capacitor structure, FIG. 7(b) is a cross-sectional view taken along line VIIB-VIIB, and FIG. 7(c) is a cross-sectional view taken along line VIIC-VIIC.

FIGS. 12(a) and 12(b) are cross-sectional views showing configuration examples of capacitor structures according to a third embodiment.

FIG. 18(a) is a perspective view showing a part of a configuration of the capacitor structure according to the fourth embodiment and FIG. 18(b) is an enlarged side view showing a part thereof.

DESCRIPTION OF EMBODIMENTS

Figure 1:
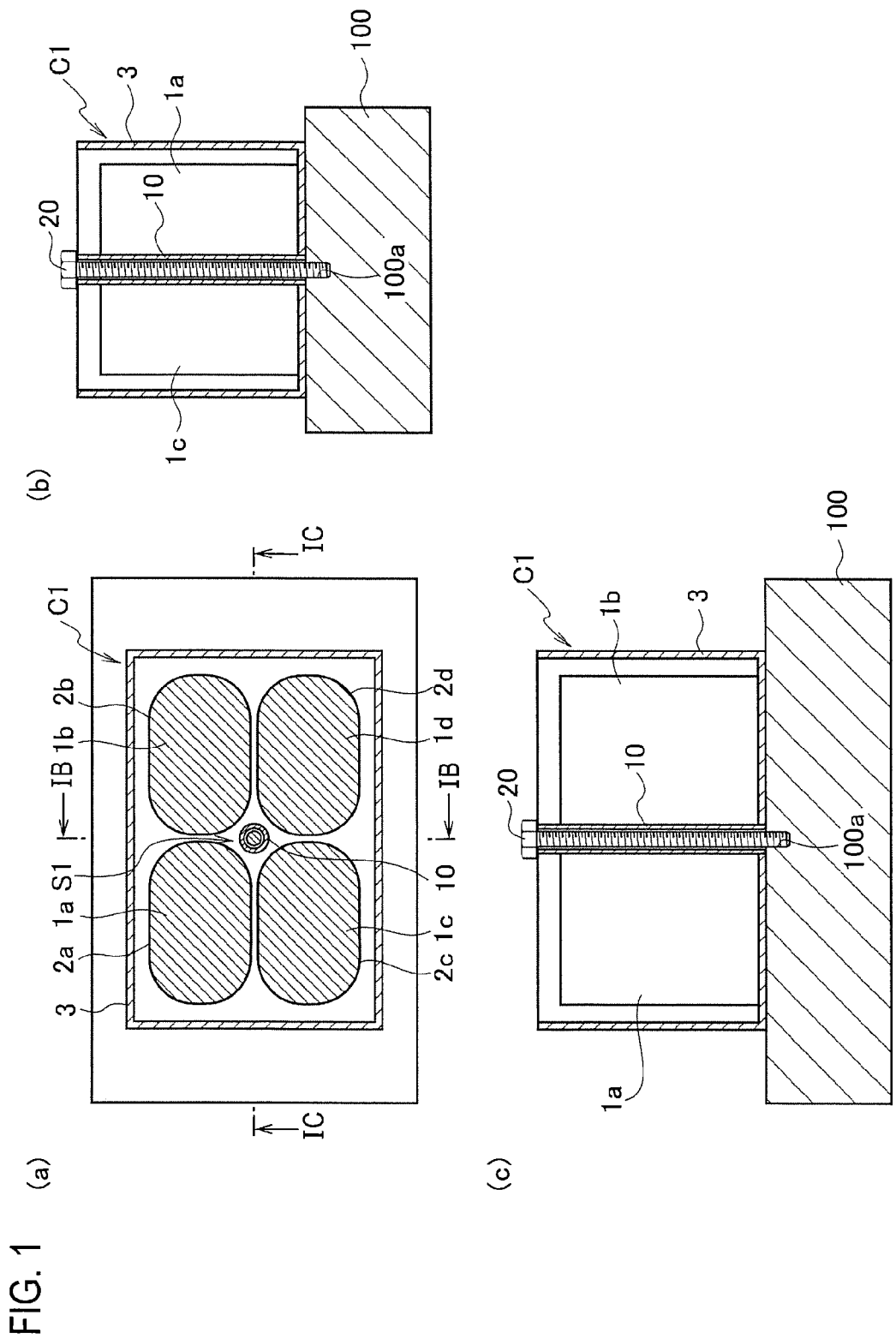
FIGS. 1(a) to 1(c) are diagrams showing a configuration example of a capacitor structure according to a first embodiment.

Hereinafter, embodiments as an example of the present invention will be described in detail with reference to the drawings. Here, in the accompanying drawings, the same members are denoted by the same reference numerals, and redundant descriptions are omitted. It should be noted that the present invention is not limited to the embodiments described below.

(Capacitor Structure According to First Embodiment)

With reference to FIGS. 1(a)-1(c) to FIG. 6, a configuration example of a capacitor structure C1 according to the first embodiment will be described.

FIGS. 1(a) to 1(c) are views showing a configuration example of the capacitor structure C1 according to the first embodiment, and FIG. 1(a) is a cross-sectional view showing a schematic configuration of the capacitor structure C1, FIG. 1(b) is a cross-sectional view taken along line IB-IB, and FIG. 1(c) is a cross-sectional view taken along line IC-IC.

As shown in FIGS. 1(a) to 1(c), the capacitor structure C1 according to the first embodiment is a capacitor structure in which a capacitor body made by storing a plurality of wound-type capacitors $1a$ to $1d$ (four elements in the example shown in FIGS. 1(a) to 1(c)) in a housing (case) 3 formed by a resin (for example, polyphenylene sulfide resin (PPS)) is fixed to a fixing object via a fastener.

With the wound-type capacitors $1a$ to $1d$ arranged side by side on the bottom of the housing 3, the capacitor body is configured to be fixed to a member (for example, a base, a member of various electric devices, etc.) 100 as the fixing object by inserting a fastener through a gap S1 formed between outer peripheral surfaces $2a$ to $2d$ of the respective wound-type capacitors $1a$ to $1d$ or at least one of gaps formed between the outer peripheral surfaces $2a$ to $2d$ of the respective wound-type capacitors $1a$ to $1d$ and the inner wall of the housing 3 (only the gap S1 in the example of the configuration shown in FIGS. 1(a) to 1(c)).

As a result, unlike the conventional case, the protrusion for fixing does not project from the housing 3, so that the entire capacitor including the housing 3 can be downsized.

In the capacitor structure C1 according to the present embodiment, the fastener is composed of a cylindrical member 10 made of a metal (for example, copper, aluminum, or the like) and to be inserted through the gap S1 formed between the outer peripheral surfaces $2a$ to $2d$ of the respective wound-type capacitors $1a$ to $1d$ and a fixing bolt 20 to be inserted into the cylindrical member 10 from the outside of the housing 3 and screwed into a bolt hole $100a$ on a member 100 which is a fixing object.

Thereby, the inner wall of the housing 3 can be supported by the metallic cylindrical member 10, and when being fixed to the fixing object 100 by the fixing bolt 20, the housing 3 can be prevented from being deformed by the fastening force.

Figure 3:
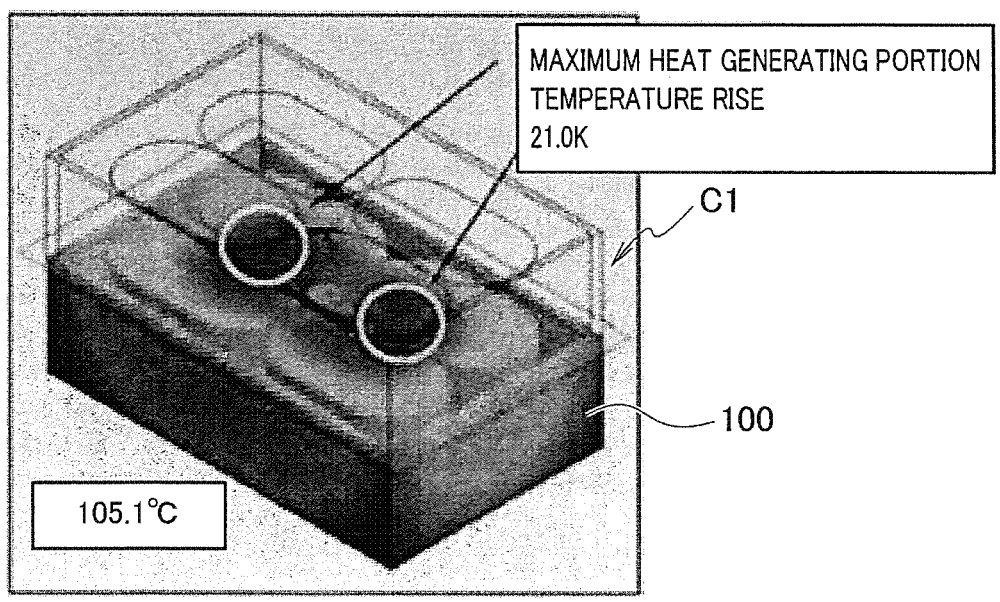
FIG. 3 is an explanatory diagram showing a thermal simulation result of the capacitor structure according to the first embodiment.

Here, with reference to FIGS. 2(a), 2(b) and 3, the heat dissipation properties of a capacitor structure C10 according to a comparative example and the capacitor structure C1 according to this embodiment are compared.

FIG. 2(a) is a cross-sectional view showing a configuration example of the capacitor structure C10 according to a comparative example, FIG. 2(b) is an explanatory view showing a result of thermal simulation thereof, and FIG. 3 is an explanatory view showing a result of thermal simulation of the capacitor structure C1 according to the first embodiment.

As shown in FIG. 2(a), the capacitor structure C10 according to the comparative example is configured such that the metallic cylindrical member 10 is not provided in the gap S1 formed between the outer peripheral surfaces $2a$ to $2d$ of the respective wound-type capacitors $1a$ to $1d$. In the thermal simulation in this case, the temperature rise in the maximum heat generating portion was 21.0 K, and the average temperature was 106.0° C.

On the other hand, in the thermal simulation of the capacitor structure C1 according to the present embodiment, the temperature rise in the maximum heat generating portion was 20.1 K, and the average temperature was 105.1° C.

As described above, the capacitor structure C1 according to the present embodiment shows a slightly lower result in each of the temperature rise and the average temperature of the maximum heat generating portion, as compared with the capacitor structure C10 according to the comparative example. It is considered that this is because in the capacitor structure C1 according to the present embodiment, a part of the heat inside the housing 3 is dissipated to the outside via the metallic cylindrical member 10 provided in the gap S1 formed between the outer peripheral surfaces $2a$ to $2d$ of the respective wound-type capacitors $1a$ to $1d$.

FIGS. 4(a) and 4(b) are cross-sectional views showing other configuration examples of the capacitor structure according to the first embodiment.

Since the basic configurations of capacitor structures C1a and C1b shown in FIGS. 4(a) and 4(b) are similar to those of the capacitor structure C1 shown in FIGS. 1(a) to 1(c), the same reference numerals are given and redundant explanation will be omitted.

In the capacitor structure C1a, in addition to the gap S1 formed between the outer peripheral surfaces $2a$ to $2d$ of the respective wound-type capacitors $1a$ to $1d$, the metallic cylindrical members 10 are also provided in gaps S2 to S5 formed between the outer peripheral surfaces 2a to 2d of the respective wound-type capacitors 1a to 1d and the inner wall of the housing 3.

In the capacitor structure C1b, in addition to the gap S1 formed between the outer peripheral surfaces 2a to 2d of the respective wound-type capacitors 1a to 1d, the metallic cylindrical members 10 are also provided in gaps S6 and S7 formed between the outer peripheral surfaces 2a to 2d of the respective wound-type capacitors 1a to 1d and the inner wall of the housing 3.

As a result, it is possible to more efficiently dissipate the heat inside the housing 3 via the plurality of metallic cylindrical members 10 as well as to reliably fix the housing 3 to the fixing object 100.

Figure 5:
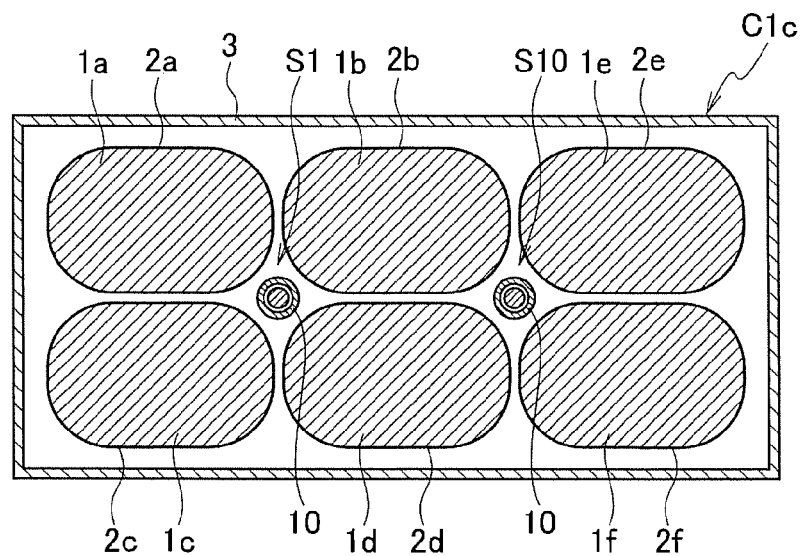
FIG. 5 is a cross-sectional view showing another configuration example of the capacitor structure according to the first embodiment.
Figure 6:
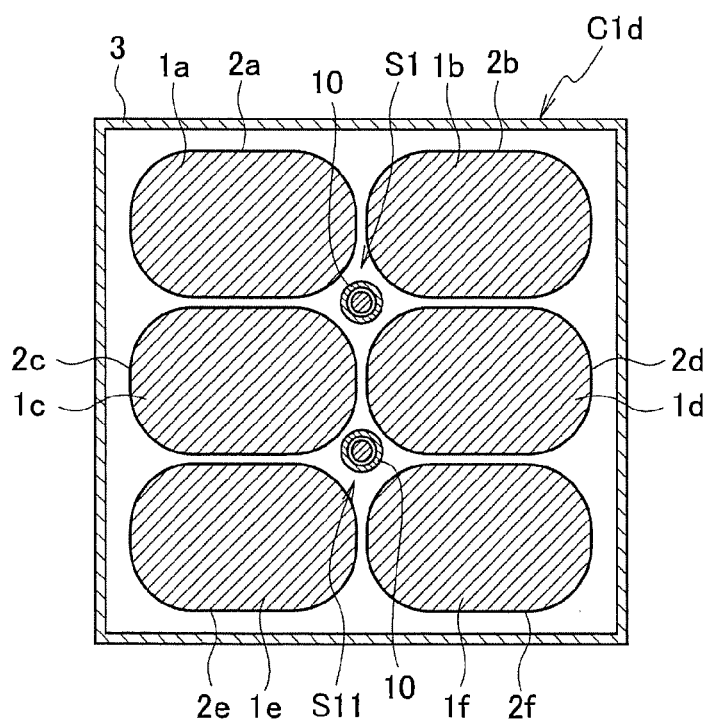
FIG. 6 is a cross-sectional view showing another configuration example of the capacitor structure according to the first embodiment.

FIGS. 5 and 6 are cross-sectional views showing other configuration examples of the capacitor structure according to the first embodiment.

Since the basic structures of capacitor structures C1c and C1d shown in FIGS. 5 and 6 are similar to those of the capacitor structure C1 shown in FIGS. 1(a) to 1(c), the same reference numerals are given and redundant description will be omitted.

In the capacitor structure C1c shown in FIG. 5, with respect to the capacitor structure C1a shown in FIG. 1(a), the housing 3 is enlarged in the horizontal direction in the plan view and four elements of the wound-type capacitors to be housed are changed to six elements (1a to 1f). The metallic cylindrical members 10 are provided in two gaps S1 and S10 formed between outer peripheral surfaces 2a to 2f of the respective wound-type capacitors 1a to 1f.

In the capacitor structure C1d shown in FIG. 6, with respect to the capacitor structure C1a shown in FIG. 1(a), the housing 3 is enlarged in the vertical direction in the plan view and four elements of the wound-type capacitors to be housed are changed to six elements (1a to 1f). The metallic cylindrical members 10 are provided in two gaps S1 and S11 formed between the outer peripheral surfaces 2a to 2f of the respective wound-type capacitors 1a to 1f.

Thereby, the housing 3 can be more reliably fixed to the fixing object 100, and heat in the housing 3 can be dissipated more efficiently via the plurality of metallic cylindrical members 10.

It should be noted that the size of the housing 3 and the number of elements of the wound-type capacitor housed in the housing 3 are not limited to four elements or six elements.

In the capacitor structures C1, C1a to C1d according to the present embodiment, the case where the wound-type capacitors 1a to 1f of an elliptical shape in a plan view is used is shown, but the invention is not limited thereto, and a circular shape or other shapes in a plan view may be employed.

(Capacitor Structure According to Second Embodiment)

With reference to FIGS. 7(a)-7(c) to FIG. 11, a configuration example of a capacitor structure C2 according to the second embodiment will be described.

Figure 7:
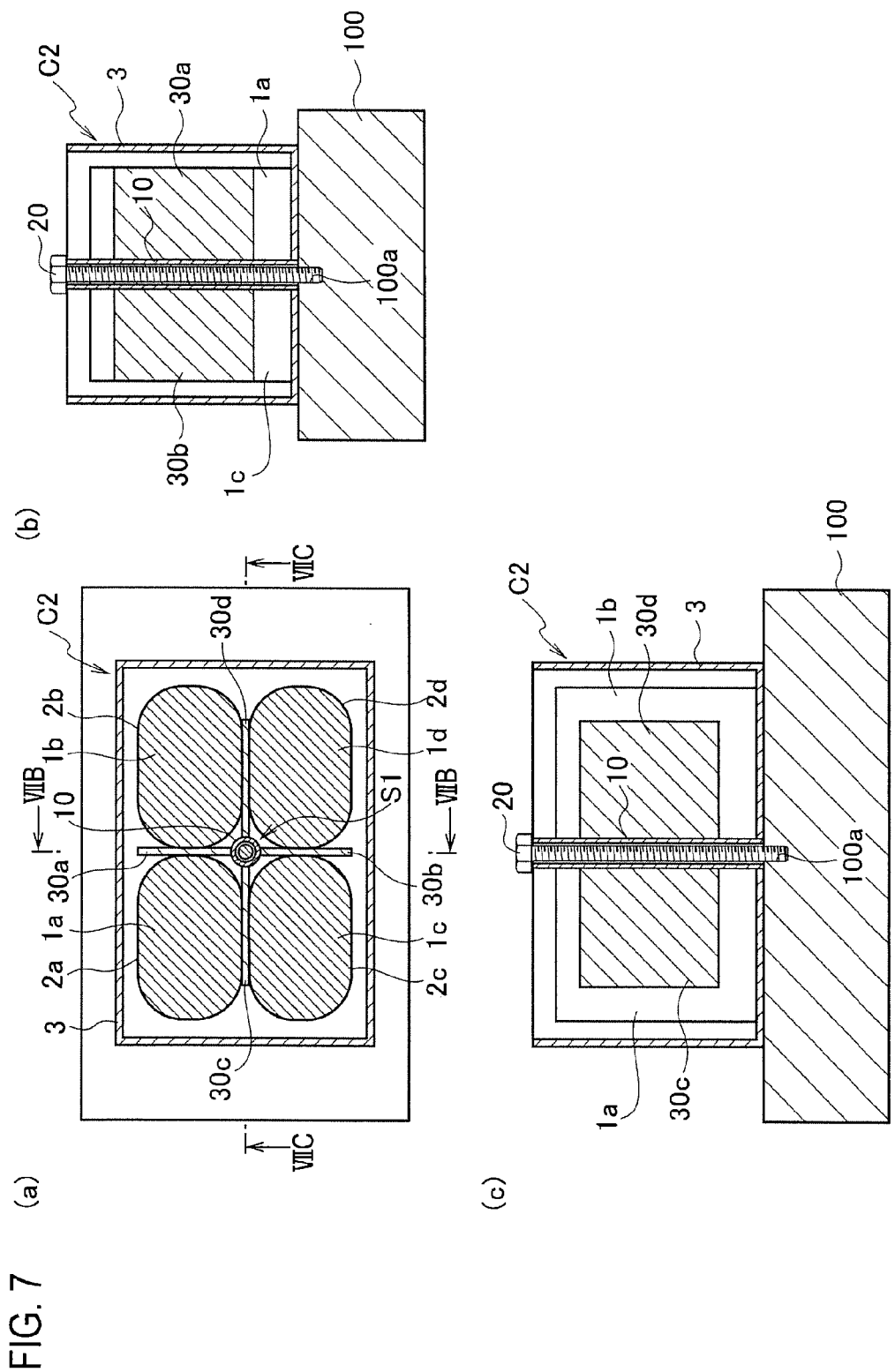
FIGS. 7(a) to 7(c) are diagrams showing a configuration example of a capacitor structure according to a second embodiment.

FIGS. 7(a) to 7(c) are diagrams showing a configuration example of the capacitor structure C2 according to the second embodiment, and FIG. 7(a) is a cross-sectional view showing a schematic configuration of the capacitor structure C2, FIG. 7(b) is a cross-sectional view taken along line VIIB-VIIB, and FIG. 7(c) is a cross-sectional view taken along line VIIC-VIIC.

Incidentally, the same reference numerals are given to similar configurations to those of the capacitor structure C1 according to the first embodiment, and redundant description will be omitted.

The capacitor structure C2 according to the second embodiment is different from the capacitor structure C1 according to the first embodiment in that heat conducting plates 30a to 30d are arranged so as to be in contact with the outer peripheral surfaces 2a to 2d of the respective wound-type capacitors 1a to 1d arranged side by side.

The heat conducting plates 30a to 30d are formed of, for example, a metal plate such as a copper or aluminum plate having a thickness of about 2 mm, and are thermally joined to the metallic cylindrical member 10.

The method of producing the heat conducting plates 30a to 30d and the cylindrical member 10 is not particularly limited, but they can be integrally formed by, for example, extrusion molding.

With such a structure, heat generated in the wound-type capacitors 1a to 1d can be efficiently released to the outside of the housing 3 via the heat conducting plates 30a to 30d, the cylindrical member 10 and the fixing bolt 20.

Figure 8:
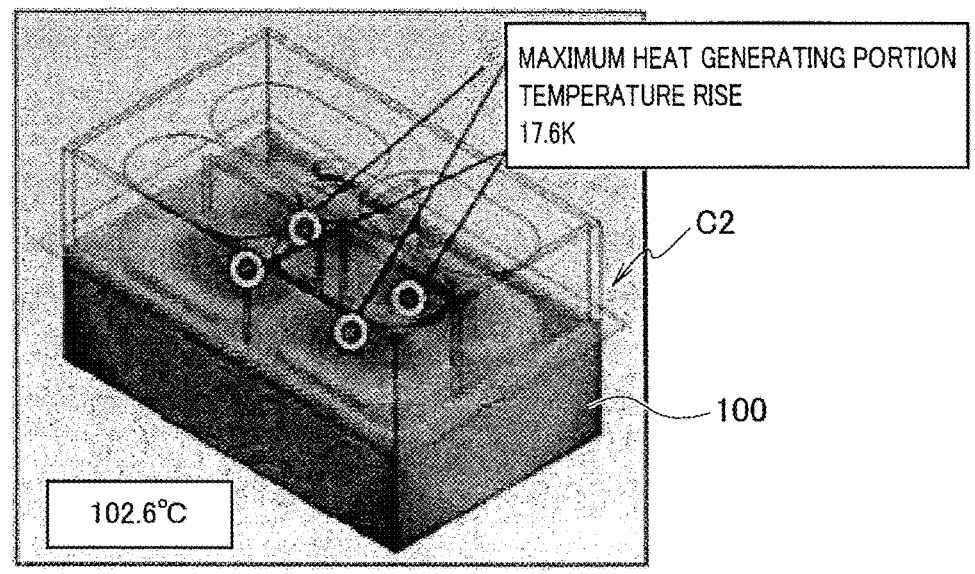
FIG. 8 is an explanatory diagram showing a thermal simulation result of the capacitor structure according to the second embodiment.

Here, FIG. 8 is an explanatory diagram showing a thermal simulation result of the capacitor structure C2 according to the second embodiment.

As shown in FIG. 8, in the capacitor structure C2, the temperature rise in the maximum heat generating portion was 17.6 K and the average temperature was 102.6° C.

In the thermal simulation of the capacitor structure C1 according to the first embodiment shown in FIG. 3, the temperature rise in the maximum heat generating portion was 20.1 K, and the average temperature was 105.1° C.

As described above, the capacitor structure C2 according to the present embodiment shows a lower result in each of the temperature rise and the average temperature of the maximum heat generating portion, as compared with the capacitor structure C1 according to the first embodiment. It is considered that this is because the heat conducting plates 30a to 30d provided in the capacitor structure C2 according to the present embodiment absorb the heat of the respective wound-type capacitors 1a to 1d and the heat is also transferred to the metallic cylindrical member 10 so as to be efficiently released to the outside of the housing 3 via the cylindrical member 10 and the fixing bolt 20.

Figure 9:
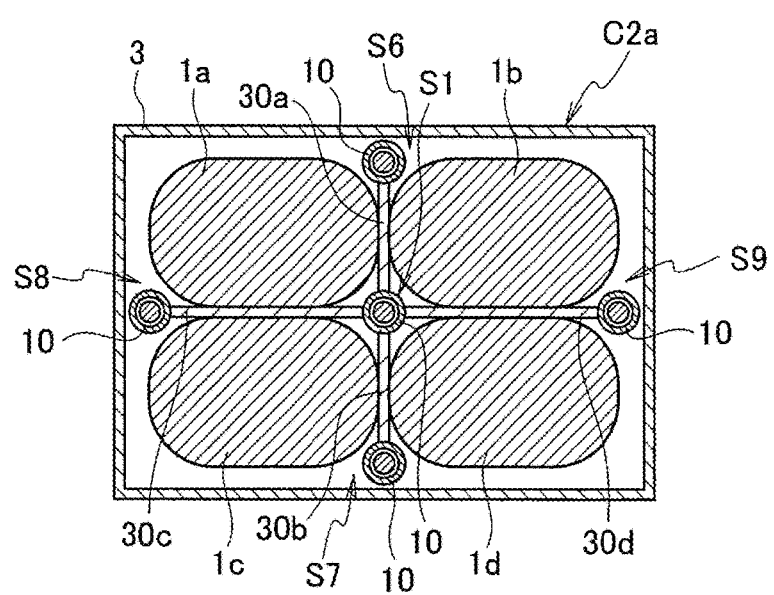
FIG. 9 is a cross-sectional view showing another configuration example of the capacitor structure according to the second embodiment.
Figure 10:
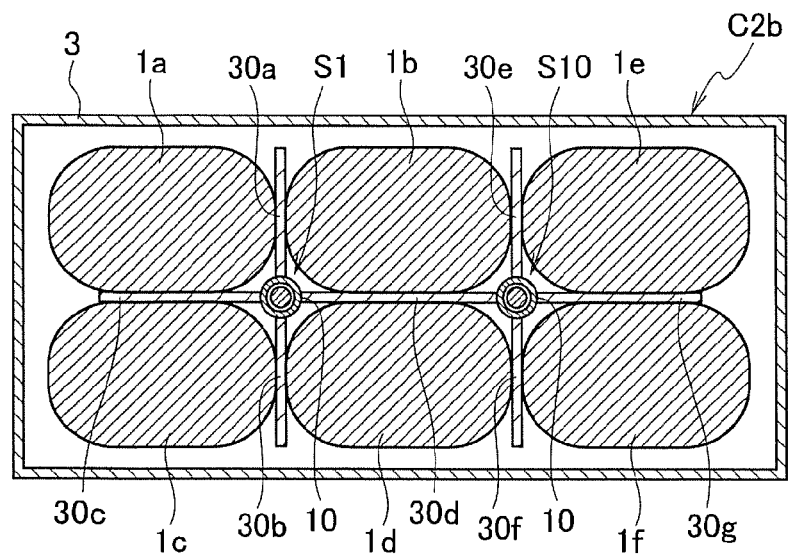
FIG. 10 is a cross-sectional view showing another configuration example of the capacitor structure according to the second embodiment.
Figure 11:
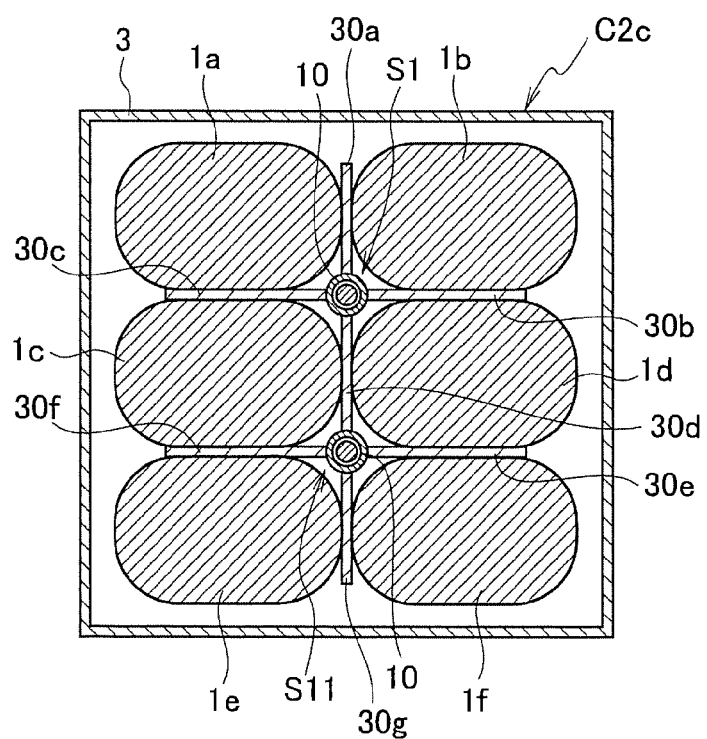
FIG. 11 is a cross-sectional view showing another configuration example of the capacitor structure according to the second embodiment.
Figure 13:
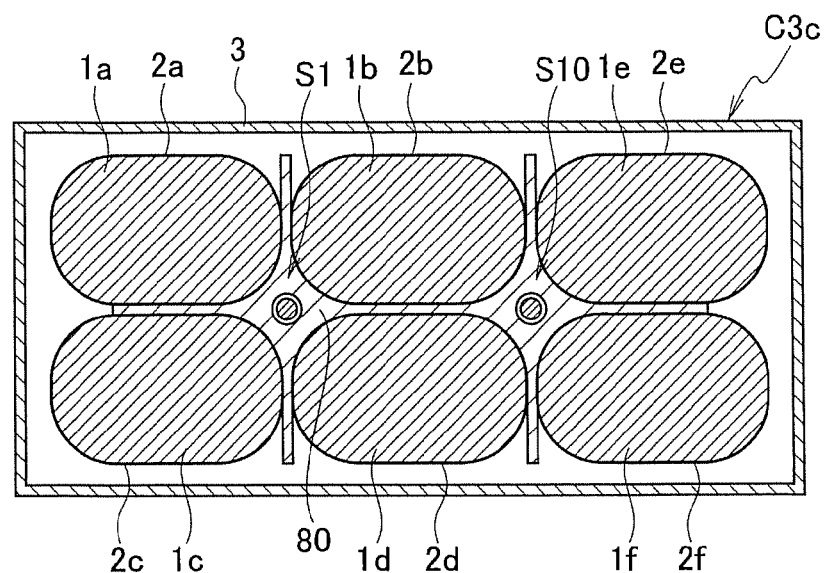
FIG. 13 is a cross-sectional view showing another configuration example of the capacitor structure according to the third embodiment.
Figure 14:
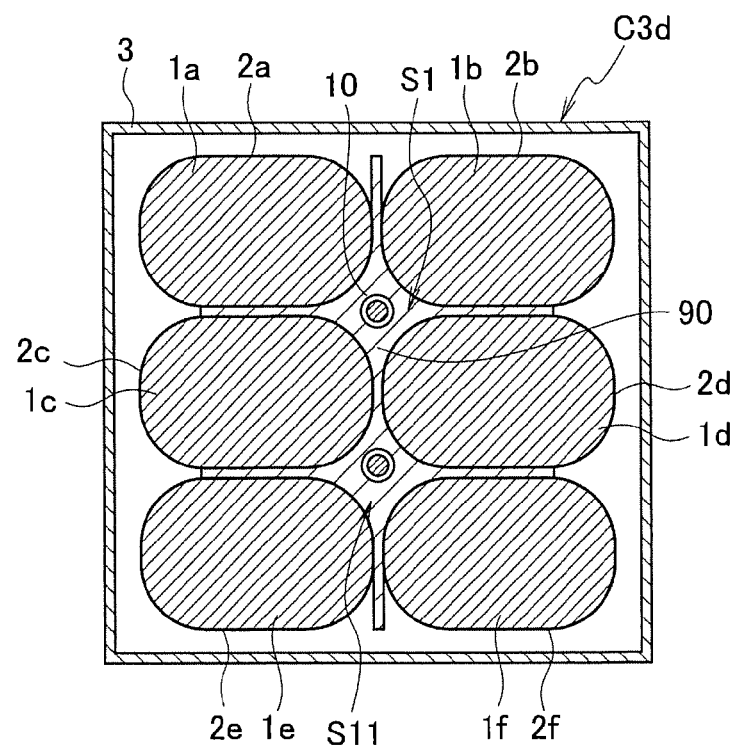
FIG. 14 is a cross-sectional view showing another configuration example of the capacitor structure according to the third embodiment.

FIGS. 9 to 11 are cross-sectional views showing another configuration example of the capacitor structure according to the second embodiment.

The basic configurations of capacitor structures C2a to C2c shown in FIGS. 9 to 11 are similar to those of the capacitor structure C1 and the like shown in FIGS. 1(a)-1(c) to FIG. 6, so that the same reference numerals are given, and redundant description will be omitted.

In the capacitor structure C2a shown in FIG. 9, the metallic cylindrical members 10 are also provided in the gaps S6 to S9 formed between the outer peripheral surfaces 2a to 2d of the respective wound-type capacitors 1a to 1d and the inner wall of the housing 3, and the metallic cylindrical members 10 are thermally connected to each other by the heat conducting plates 30a to 30d.

Due to this, the heat of each of the wound-type capacitors 1a to 1d is absorbed by the heat conducting plates 30a to 30d, and is transmitted to the plurality of metallic cylindrical members 10 at the same time, so that the heat can be dissipated more efficiently to the outside of the housing 3 via each of the cylindrical members 10 and each of the fixing bolts 20.

In the capacitor structure C2b shown in FIG. 10, the metallic cylindrical members 10 are provided in the gaps S1 and S10, and the metallic cylindrical members 10 are thermally connected together by heat conducting plates 30a to 30g.

As a result, the heat of each of the wound-type capacitors 1a to 1f is absorbed by the heat conducting plates 30a to 30g, and the heat is conducted to the two metallic cylindrical members 10 so as to be dissipated through each of the cylindrical members 10 and each of the fixing bolts 20 to the outside of the housing 3 efficiently.

In the capacitor structure C2c shown in FIG. 11, the metallic cylindrical members 10 are provided in the gaps S1 and S11 and the metallic cylindrical members 10 are thermally connected by the heat conducting plates 30a to 30g.

Due to this, the heat of each of the wound-type capacitors 1a to 1f is absorbed by the heat conducting plates 30a to 30g, and the heat is conducted to the two metallic cylindrical members 10 so as to be dissipated to the outside of the housing 3 efficiently through each of the cylindrical members 10 and each of the fixing bolts 20.

Incidentally, the size of the housing 3 and the number of elements of the wound-type capacitor housed in the housing 3 are not limited to four elements or six elements.

Further, in the capacitor structures C2, C2a to C2c according to the present embodiment, the case where the wound-type capacitors 1a to 1f of an elliptical shape in a plan view are used is shown, but the present invention is not limited thereto, a circular shape or other shapes in a plan view may be employed.

(Capacitor Structure According to Third Embodiment)

A configuration example of capacitor structures C3a to C3d according to the third embodiment will be described with reference to FIGS. 12(a), 12(b) to 14.

FIGS. 12(a), 12(b) to 14 are cross-sectional views showing configuration examples of the capacitor structures C3a to C3d according to the third embodiment.

Incidentally, the same reference numerals are given to similar configurations to those of the capacitor structure C2 according to the second embodiment and the like, and redundant description will be omitted.

As shown in FIGS. 12(a), 12(b) to 14, in the capacitor structures C3a to C3d according to the third embodiment, the cross-sectional shapes of cylindrical members 50 to 90 are formed to be similar to the shapes of the gaps S1 to S11 in a plan view.

The outer wall surfaces of the cylindrical members 50 to 90 are configured so as to be in contact with the outer peripheral surfaces 2a to 2f of the wound-type capacitors 1a to 1f forming the respective gaps S1 to S11.

As described above, according to the capacitor structures C3a to C3d of the third embodiment, the cross-sectional shapes of the cylindrical members 50 to 90 are formed in shapes similar to the plan view shapes of the gaps S1 to S11, and since the outer wall surfaces of the cylindrical members 50 to 90 are in contact with the outer peripheral surfaces 2a to 2f of the wound-type capacitors 1a to 1f forming the gaps S1 to S11, heat generated in the wound-type capacitors 1a to 1f can be efficiently released to the outside of the housing.

(Capacitor Structure According to Fourth Embodiment)

With reference to FIGS. 15 to 21, a configuration example of a capacitor structure C4 according to the fourth embodiment will be described.

Figure 15:
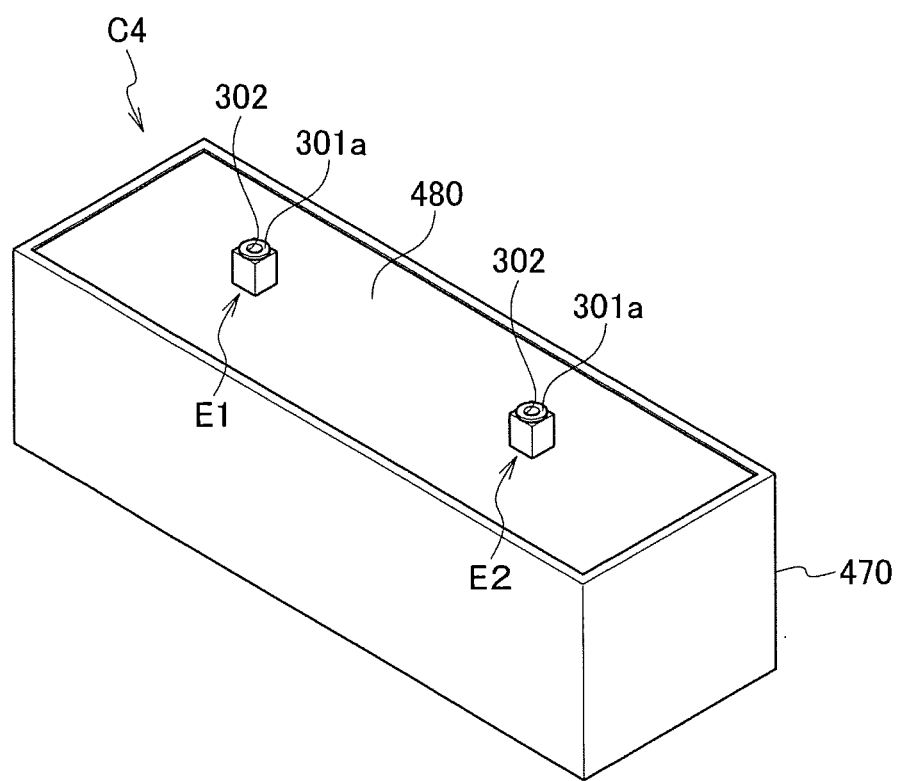
FIG. 15 is a perspective view showing a configuration example of a capacitor to which a capacitor structure according to a fourth embodiment is applied.

FIG. 15 is a perspective view showing a configuration example of a capacitor to which the capacitor structure C4 according to the fourth embodiment is applied.

As shown in FIG. 15, the capacitor structure C4 is configured so as to house a capacitor module M described below in a housing 470 made of a resin and by being filled with an insulating resin (for example, epoxy resin) 480.

On the upper surface on the resin side, one ends 301a of a first metallic cylindrical member 301A and a second metallic cylindrical member 301B constituting terminals E1 and E2 are exposed.

Here, with reference to FIGS. 16 to 21, the configuration and the like of each part of the capacitor module M constituting the capacitor structure C4 will be described.

Figure 16:
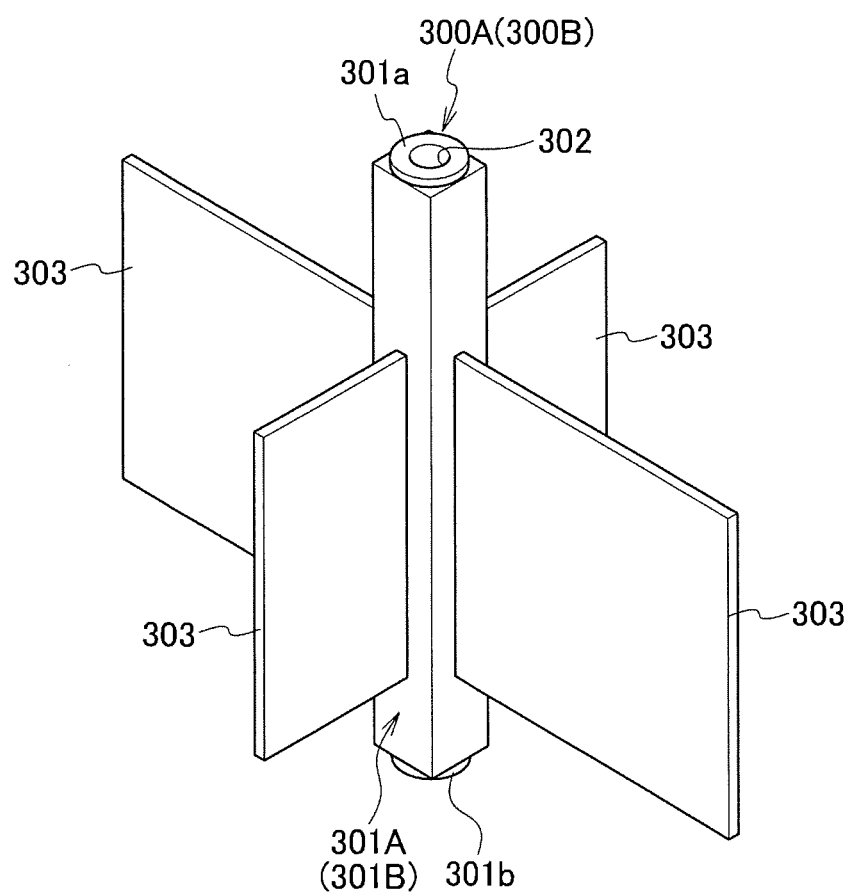
FIG. 16 is a perspective view showing a configuration example of a heat conducting member including a cylindrical member and a heat conducting plate used in the capacitor structure according to the fourth embodiment.

First, FIG. 16 is a perspective view showing a configuration example of a heat conducting member 300A (300B) composed of the cylindrical member 301A (301B) and a heat conducting plate 303 used in the capacitor structure C4 according to the fourth embodiment.

As shown in FIG. 16, the heat conducting member 300A (300B) has a shape in which the heat conducting plate 303 is joined to each side face of the rectangular-column-shaped cylindrical member 301A (301B).

The method of manufacturing the heat conducting member 300A (300B) is not particularly limited, but the member can be integrally formed by extrusion molding of an aluminum material or the like, for example.

An insertion hole 302 through which the fixing bolt can be inserted is formed in the cylindrical member 301A (301B).

Figure 17:
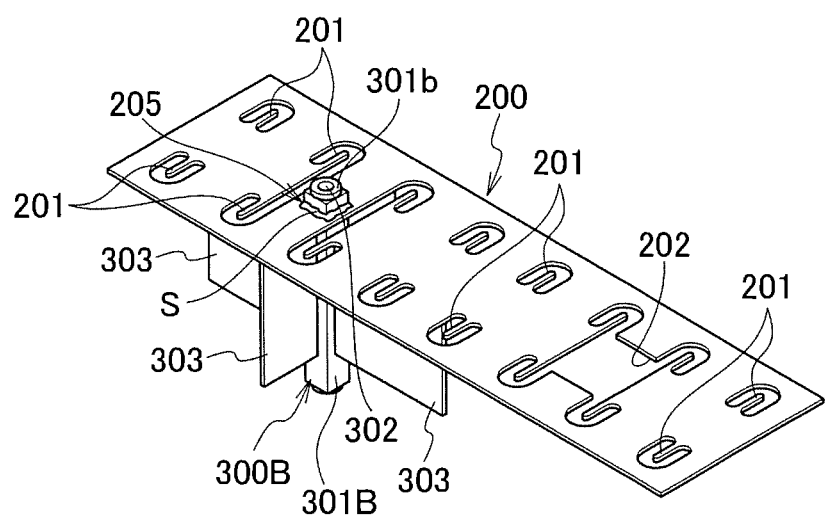
FIG. 17 is a perspective view showing a part of a configuration of the capacitor structure according to the fourth embodiment.

FIG. 17 is a perspective view showing a part of the configuration of the capacitor structure C4 according to the fourth embodiment.

As shown in FIG. 17, the other end 301b of the second metallic cylindrical member 301B is joined to one surface side of a second electrode plate 200.

The second electrode plate 200 is formed by, for example, a punching process of a copper plate or the like, and functions as a bus bar that electrically connects a plurality of wound-type capacitors 1a to 1h together as described later.

A plurality of junctions 201 to be soldered to the lower terminals (for example, the negative electrode terminals) of the wound-type capacitors 1a to 1h are formed on the second electrode plate 200. In addition, formed is an insertion part 202 through which the other end 301b of the first cylindrical member 301A of the other heat conducting member 300A is inserted.

The other end 301b of the cylindrical member 301B of the heat conducting member 300B is electrically connected to the second electrode plate 200 via a junction 205 with solder S.

FIG. 18(a) is a perspective view showing a part of the configuration of the capacitor structure C4 according to the fourth embodiment, and FIG. 18(b) is a partially enlarged side view of the capacitor structure C4.

As shown in FIGS. 18(a) and 18(b), the one end 301a of the first cylindrical member 301A of the heat conducting member 300A is joined to one surface side of a first electrode plate 400.

The first electrode plate 400 is constituted by a punching process of a copper plate or the like for example, and functions as a bus bar for electrically connecting the plurality of wound-type capacitors 1a to 1h together as described later.

On the first electrode plate 400, a plurality of junctions 401 to be jointed to the upper terminals (for example, the positive electrode terminals) of the wound-type capacitors 1a to 1h are formed (see FIG. 18(a)). Further, formed is an insertion part 402 through which one end 301a of the second cylindrical member 301B of the other heat conducting member 300B is inserted.

Here, a junction 410 of the first electrode plate 400 has a step H having a height of several millimeters for example, in a direction away from the wound-type capacitors 1a to 1h (upward in FIGS. 18(a) and 18(b)). It should be noted that a similar step may be provided on the junction 205 of the second electrode plate 200.

The one end 301a of the first cylindrical member 301A of the heat conducting member 300A is joined to the first electrode plate 400 with the solder S via an insertion hole 410a of the junction 410. Thereby, reliable electrical joining can be performed.

Incidentally, soldering between the one end 301a of the first cylindrical member 301A of the heat conducting member 300A and the junction 410 can be performed after placing the first electrode plate 400 on the wound-type capacitors 1a to 1h.

In this case, since the step H is formed at the junction 410 of the first electrode plate 400, when the first electrode plate 400 and the first cylindrical member 301A are soldered, damage of the capacitor elements in the wound-type capacitors 1a to 1h caused by thermal conduction can be reduced.

Figure 19:
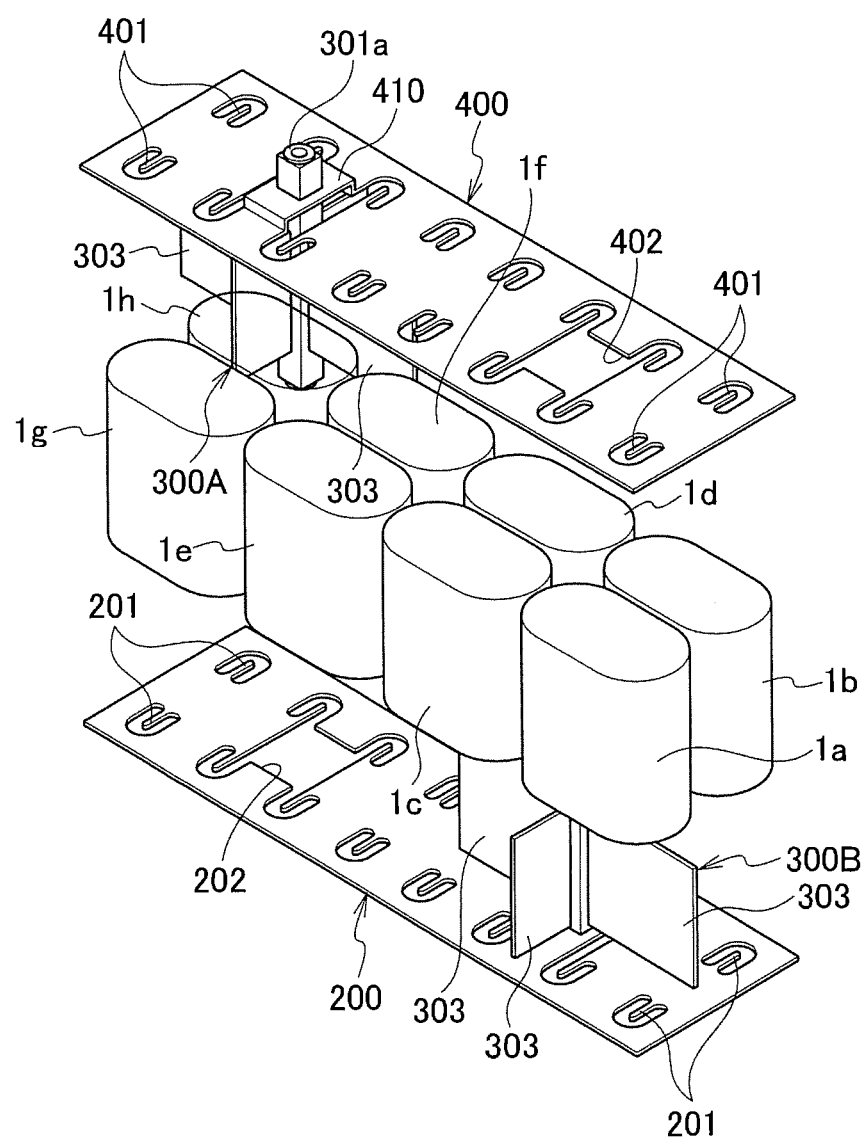
FIG. 19 is an exploded perspective view showing a capacitor module constituting a capacitor structure according to the fourth embodiment.

FIG. 19 is an exploded perspective view of the capacitor module M constituting the capacitor structure C4 according to the fourth embodiment.

In the configuration example shown in FIG. 19, the eight wound-type capacitors 1a to 1h are aligned, and the second electrode plate 200 is mounted on the lower surface side of the wound-type capacitors 1a to 1h, and the first electrode plate 400 is mounted on the upper surface side of the wound-type capacitors 1a to 1h so as to be in contact with the wound-type capacitors respectively.

As shown in FIGS. 17 to 19, the heat conducting member 300B is arranged on the second electrode plate 200, and the heat conducting member 300A is arranged on the first electrode plate 400.

Further, the heat conducting plate 303 of each of the heat conducting members 300A and 300B is brought into contact with the side faces of the wound-type capacitors 1a to 1h.

As described above, soldering the one end 301a of the first cylindrical member 301A of the heat conducting member 300A and the junction 410 may be performed after placing the first electrode plate 400 on the wound-type capacitors 1a to 1h.

Figure 20:
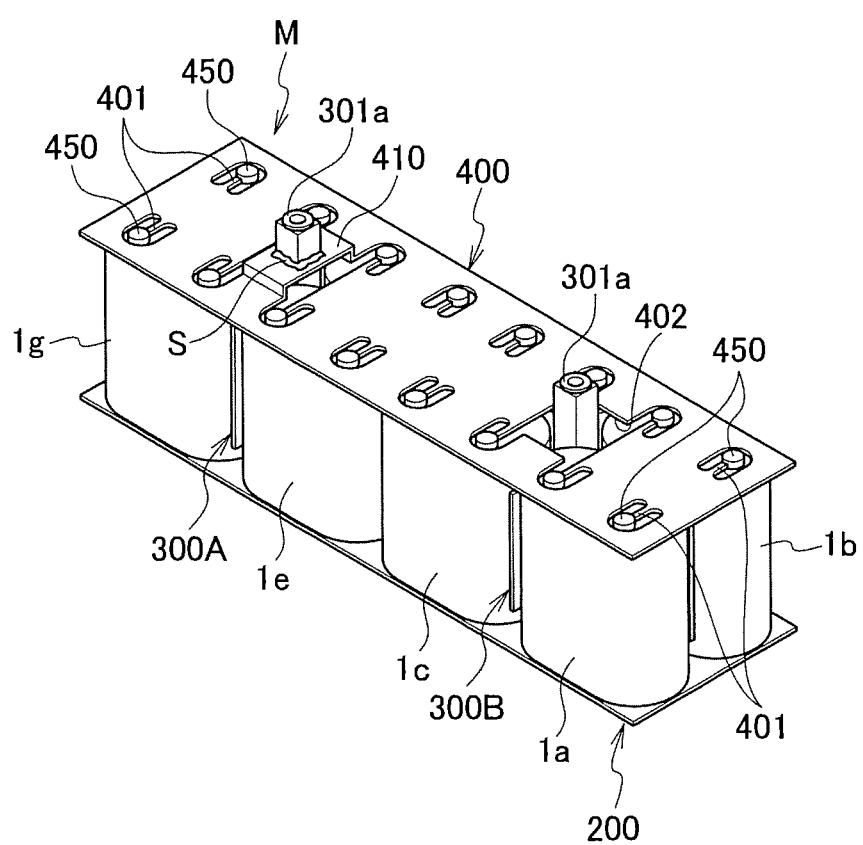
FIG. 20 is a perspective view showing a configuration example of the capacitor module constituting the capacitor structure according to the fourth embodiment.

FIG. 20 is a perspective view showing a configuration example of the assembled capacitor module M constituting the capacitor structure C4 according to the fourth embodiment.

As shown in FIG. 20, the first electrode plate 400 and the second electrode plate 200 are mounted on the wound-type capacitors 1a to 1h.

At this time, the one end 301a of the heat conducting member 300B is exposed toward the upper surface side through the insertion part 402 formed in the first electrode plate 400. The insertion part 402 constitutes a first insulating portion for insulating the first electrode plate 400 from the second metallic cylindrical member 301B.

Although not shown in FIG. 20, the other end 301b of the heat conducting member 300B is exposed toward the lower surface side through the insertion part 202 (see FIG. 19 and others) formed in the second electrode plate 200. The insertion part 202 constitutes a second insulating portion for insulating the second electrode plate 200 from the first metallic cylindrical member 301A.

Then, in such an assembled state, soldering between the one end 301a of the first cylindrical member 301A of the heat conducting member 300A and the junction 410 can be performed.

At this time, since the step H is formed at the junction 410 of the first electrode plate 400, damage of the capacitor elements of the wound-type capacitors 1a to 1h caused by thermal conduction is reduced.

In addition, each junction 401 of the first electrode plate 400 is joined to the terminal face on the upper side of the wound-type capacitors 1a to 1h by a joint material 450.

Although not shown in the drawing, each junction 201 of the second electrode plate 200 is also joined to the lower terminal face of the wound-type capacitors 1a to 1h by a joint material.

Figure 21:
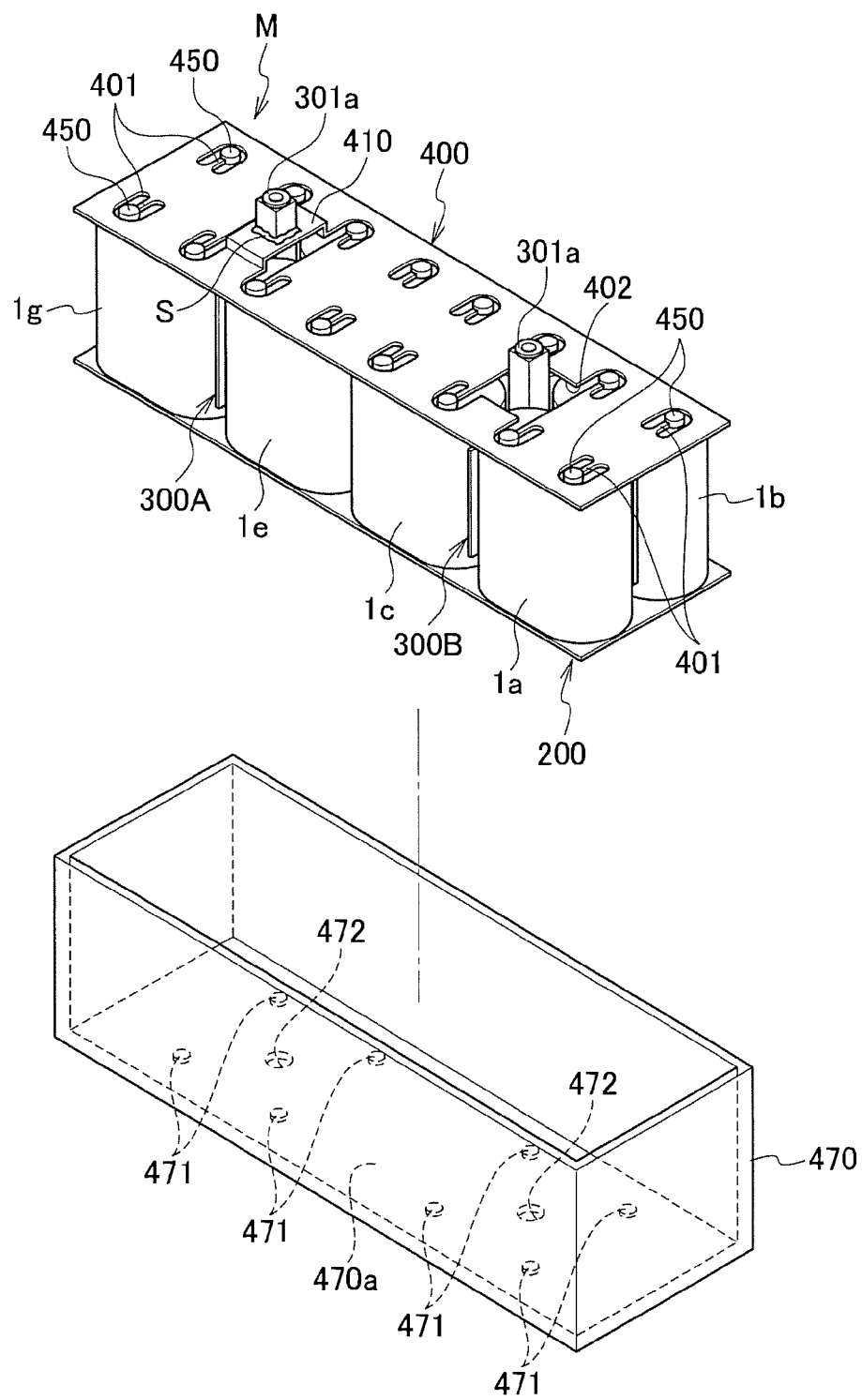
FIG. 21 is an explanatory view showing a state in which a capacitor module constituting the capacitor structure according to the fourth embodiment is housed in a housing.
Figure 22:
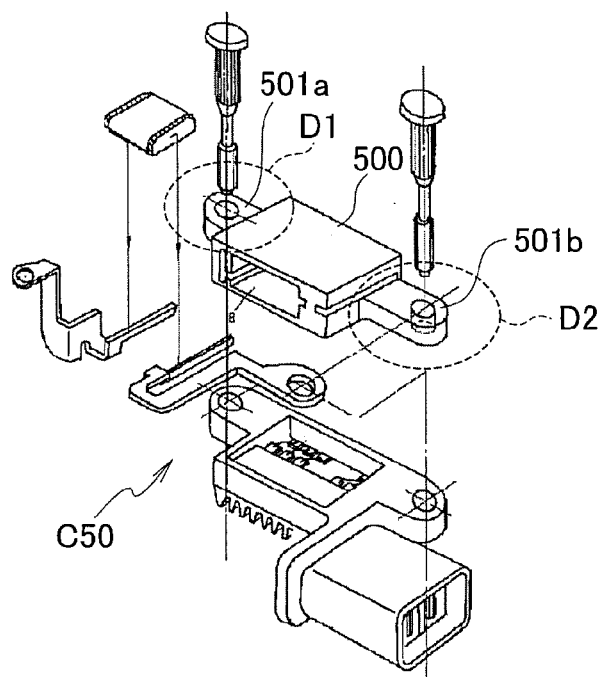
FIG. 22 is a perspective view showing a capacitor structure according to a comparative example.
Figure 23:
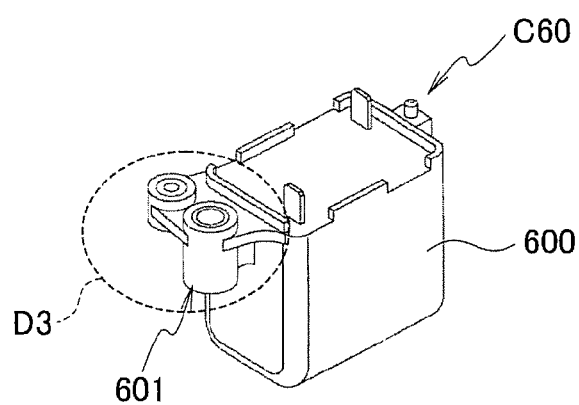
FIG. 23 is a perspective view showing a capacitor structure according to another comparative example.

FIG. 21 is an explanatory view showing a state in which the capacitor module M constituting the capacitor structure C4 according to the fourth embodiment is housed in the housing 470.

The housing 470 is molded with an insulating resin, and the upper surface side thereof is open.

Then, the capacitor module M assembled as shown in FIG. 20 is housed in the housing 470 by being lowered from the opened upper surface side with the second electrode plate 200 on the lower side.

It should be noted that, protrusions 471 for engaging with the second electrode plate 200 of the capacitor module M for positioning is provided on the bottom surface 470a of the housing 470.

Insertion holes 472 for exposing the other ends 301b of the heat conducting members 300A and 300B of the capacitor module M to the outside is provided on the bottom surface 470a of the housing 470.

In a state where the capacitor module M is housed in the housing 470, a seal is applied to the gap between the insertion hole 472 and the other ends 301b of the heat conducting members 300A and 300B to prevent the resin filling the housing 470 from leaking as described later.

Then, the gap between the inner wall or the like of the housing 470 and the capacitor module M, and the upper surface side of the capacitor module M is filled with the insulating resin (for example, epoxy resin) 480 to form the capacitor structure C4 as shown in FIG. 15.

As shown in FIG. 15, the one ends 301a of the first metallic cylindrical member 301A and the second metallic cylindrical member 301B constituting the terminals E1 and E2 are exposed on the upper surface of the resin 480.

Due to this, the capacitor having the capacitor structure C4 can be connected to various devices via the terminals E1 and E2.

According to the capacitor structure C4 of the fourth embodiment having the configuration as described above, by arranging the first electrode plate 400 and the second electrode plate 200 in the housing 470 and by allowing the metallic cylindrical members 301A and 301B of the heat conducting members 300A and 300B to have an electrically connecting function, the electrical connection of the wound-type capacitors 1a to 1h can be achieved without exposing the first electrode plate 400 and the second electrode plate 200 that are bus bars from the housing 470. With this configuration, the size of the entire capacitor including the housing 470 can be reduced. In addition, inductance can be reduced, and electrical characteristics can be improved.

The configuration of the capacitor structure C4 according to the fourth embodiment has the step H in a direction away from the wound-type capacitors 1a to 1h in at least one of the junctions 410 and 205 of the first electrode plate and the second electrode plate. Therefore, when the first electrode plate 400, the second electrode plate 200 and the metallic cylindrical members 301A and 301B are soldered, damage to the capacitor elements of the wound-type capacitors 1a to 1h due to heat conduction can be reduced.

In addition, since the edge of the insertion hole 410a of the junction 410 and the one end 301a of the first metallic cylindrical member 301A are joined together with solder, reliable electrical joining can be performed.

In this embodiment, shown is the case where the one ends 301a of the first metallic cylindrical member 301A and the second metallic cylindrical member 301B are exposed from the upper surface of the resin 480 to form the terminals E1 and E2. However, the present invention is not limited to this, and the terminals E1 and E2 may be configured to be exposed from the side surface or the bottom surface of the housing 470 via a conductive plate from the one ends 301a of the first metallic cylindrical member 301A and the second metallic cylindrical member 301B.

Hereinabove, although the present invention made by the inventor has been specifically described based on the embodiment, the embodiment disclosed in the present specification is an example in all respects, and it should be considered that the invention is not limited to the disclosed techniques. Namely, the technical scope of the present invention is not interpreted limitedly based on the description in the above embodiment, but should be interpreted in accordance with the scope of the claims, and the technical scope of the invention should include all changes without departing from techniques equivalent to the techniques described in the scope of claims and the gist of the scope of claims.

It should be noted that the present application claims priority to Japanese Patent Application No. 2015-010209, filed on Jan. 22, 2015, and Japanese Patent Application No. 2015-0164866, filed on Aug. 24, 2015, the entire contents of which are incorporated by reference herein.

INDUSTRIAL APPLICABILITY

According to the capacitor structure of one aspect of the present invention, the protrusion for fixing does not project from the housing. Therefore, the entire capacitor including the housing can be downsized. Also, heat can be dissipated through fasteners.

REFERENCE SIGNS LIST

C1, C1 to C1d, C2, C2a to C2c, C3a to C3d, C4 CAPACITOR STRUCTURE
S1 to S11 GAP
1a to 1h WOUND-TYPE CAPACITOR
2a to 2f OUTER PERIPHERAL SURFACE
3, 470 HOUSING
10, 50, 60, 70, 80, 90 CYLINDRICAL MEMBER
20 FIXING BOLT
30a to 30g, 303 HEAT CONDUCTING PLATE
100 FIXING OBJECT
100a BOLT HOLE
200 SECOND ELECTRODE PLATE
201 JUNCTION
202 INSERTION PART (SECOND INSULATING PORTION)
402 INSERTION PART (FIRST INSULATING PORTION)
300A, 300B HEAT CONDUCTING MEMBER
301A FIRST METALLIC CYLINDRICAL MEMBER
301B SECOND METALLIC CYLINDRICAL MEMBER
302 INSERTION HOLE
301a ONE END
301b OTHER END
400 FIRST ELECTRODE PLATE
450 JOINT MATERIAL
480 RESIN
205, 410 JUNCTION
H STEP
E1, E2 TERMINAL
M CAPACITOR MODULE
S SOLDER

The invention claimed is:

1. A capacitor structure comprising:
a plurality of wound-type capacitors;
a housing which houses the plurality of wound-type capacitors; and
a fastener which fixes a capacitor body in which the plurality of wound-type capacitors are stored in the housing to a fixing object,
wherein, in a state in which the wound-type capacitors are arranged side by side on a bottom of the housing, the capacitor body is configured to be fixed to the fixing object by inserting the fastener into at least one of gaps formed between outer peripheral surfaces of the respective wound-type capacitors or formed between the outer peripheral surfaces of the respective wound-type capacitors and an inner wall of the housing,
the housing into which the wound-type capacitors and the fastener are inserted is filled with a resin and the wound-type capacitors are fixed in the housing by the resin, and
the fastener includes:
a metallic cylindrical member formed to be longer than an overall length of the wound-type capacitors and inserted into the at least one of the gaps; and
a fixing bolt inserted from an outside of the housing into the cylindrical member so as to pass through the cylindrical member and screwed to the fixing object to be fixed.

2. The capacitor structure according to claim 1,
wherein the fastener includes a heat conducting plate arranged so as to be in contact with the outer peripheral surfaces of the respective wound-type capacitors arranged side by side, and
the heat conducting plate is thermally joined to the metallic cylindrical member.

3. The capacitor structure according to claim 1,
wherein a cross-sectional shape of the cylindrical member is similar to a shape of the gap in a plan view, and
an outer wall surface of the cylindrical member is configured to be in contact with the outer peripheral surfaces of the wound-type capacitors forming the gap.

4. The capacitor structure according to claim 1, further comprising:
a first electrode plate arranged on a positive electrode terminal side of the respective wound-type capacitors; and
a second electrode plate arranged on a negative electrode terminal side of the respective wound-type capacitors,
wherein the metallic cylindrical member includes a first metallic cylindrical member and a second metallic cylindrical member,
the first metallic cylindrical member is joined to the first electrode plate,
the second metallic cylindrical member is joined to the second electrode plate, and
each of ends of the first metallic cylindrical member and the second metallic cylindrical member, which is fastened to the fixing object, is exposed to the outside of the housing to constitute a terminal.

5. The capacitor structure according to claim 4, wherein a first insulating portion that insulates the first electrode plate from the second metallic cylindrical member is formed on the first electrode plate, and a second insulating portion that insulates the second electrode plate from the first metallic cylindrical member is formed on the second electrode plate.

6. The capacitor structure according to claim 4, wherein a junction between the first metallic cylindrical member and the first electrode plate or a junction between the second metallic cylindrical member and the second electrode plate includes a step formed in a direction away from the wound-type capacitors.

7. The capacitor structure according to claim 6, wherein the junction includes an insertion hole into which an end of the first metallic cylindrical member or the second metallic cylindrical member is inserted, and an edge of the insertion hole and the end of the first metallic cylindrical member or the second metallic cylindrical member are joined with solder.

8. A capacitor structure comprising:
a plurality of wound-type capacitors;
a housing which houses the plurality of wound-type capacitors; and
a fastener which fixes a capacitor body in which the plurality of wound-type capacitors are stored in the housing to a fixing object,
wherein, in a state in which the wound-type capacitors are arranged side by side on a bottom of the housing, the capacitor body is configured to be fixed to the fixing object by inserting the fastener into at least one of gaps formed between outer peripheral surfaces of the respective wound-type capacitors or formed between the outer peripheral surfaces of the respective wound-type capacitors and an inner wall of the housing,
the housing into which the wound-type capacitors and the fastener are inserted is filled with a resin and the wound-type capacitors are fixed in the housing by the resin,
the fastener includes:
a metallic cylindrical member inserted into the at least one of the gaps; and
a fixing bolt inserted from an outside of the housing into the cylindrical member and screwed to the fixing object,
the fastener includes a heat conducting plate arranged so as to be in contact with the outer peripheral surfaces of the respective wound-type capacitors arranged side by side, and
the heat conducting plate is thermally joined to the metallic cylindrical member.

9. The capacitor structure according to claim 8, wherein a cross-sectional shape of the cylindrical member is similar to a shape of the gap in a plan view, and an outer wall surface of the cylindrical member is configured to be in contact with the outer peripheral surfaces of the wound-type capacitors forming the gap.

10. The capacitor structure according to claim 8, further comprising:
a first electrode plate arranged on a positive electrode terminal side of the respective wound-type capacitors; and
a second electrode plate arranged on a negative electrode terminal side of the respective wound-type capacitors,
wherein the metallic cylindrical member includes a first metallic cylindrical member and a second metallic cylindrical member,
the first metallic cylindrical member is joined to the first electrode plate,
the second metallic cylindrical member is joined to the second electrode plate, and
each of ends of the first metallic cylindrical member and the second metallic cylindrical member, which is fastened to the fixing object, is exposed to the outside of the housing to constitute a terminal.

11. The capacitor structure according to claim 10, wherein a first insulating portion that insulates the first electrode plate from the second metallic cylindrical member is formed on the first electrode plate, and a second insulating portion that insulates the second electrode plate from the first metallic cylindrical member is formed on the second electrode plate.

12. The capacitor structure according to claim 10, wherein a junction between the first metallic cylindrical member and the first electrode plate or a junction between the second metallic cylindrical member and the second electrode plate includes a step formed in a direction away from the wound-type capacitors.

13. The capacitor structure according to claim 12, wherein the junction includes an insertion hole into which an end of the first metallic cylindrical member or the second metallic cylindrical member is inserted, and an edge of the insertion hole and the end of the first metallic cylindrical member or the second metallic cylindrical member are joined with solder.

* * * * *